United States Patent [19]
Isaksson et al.

[11] 3,946,288
[45] Mar. 23, 1976

[54] SAFETY DEVICE FOR DYNAMIC UNITS

[75] Inventors: Ove Isaksson, Pitea; Rolf Engberg, Lillpite, both of Sweden

[73] Assignee: Ove Gustav Isaksson, Pitea, Sweden

[22] Filed: June 7, 1974

[21] Appl. No.: 477,209

[30] Foreign Application Priority Data
June 12, 1973 Sweden.............................. 7308217

[52] U.S. Cl........ 317/148.5 R; 180/99; 317/DIG. 2; 340/279
[51] Int. Cl.² .......................................... H02H 5/00
[58] Field of Search................ 317/DIG. 2, 148.5 R; 340/279, 421; 307/10 R; 180/99

[56] References Cited
UNITED STATES PATENTS
3,026,503  3/1962  Scheer.................................. 180/99
FOREIGN PATENTS OR APPLICATIONS
1,918,401  10/1970  Germany...................... 317/DIG. 2

*Primary Examiner*—R. N. Envall, Jr.
*Attorney, Agent, or Firm*—Pollock, Vande Sande & Priddy

[57]  ABSTRACT

Safety apparatus for vehicles, machinery, and the like to provide a distinctive signal in the event of the incapacitation or drowsiness of an operator. Spaced electrical conductors are supported on a hand-grip control means such as the steering wheel of a vehicle to provide thereby an open circuit which is capable of being bridged by a body portion of the operator such as the hand of the driver on the steering wheel during normal vehicle operation. An output means is also provided which gives a distinctive signal, and this output means is controlled by a circuit coupled between the conductors and such output means. The circuit is effective to control the output means to provide its distinctive signal indicative of incapacitation of the driver both under the condition where the conductors are open circuited or bridged by a resistance whose value lies above a predetermined range as well as by a short circuiting of the conductors which may occur by, for example, a ring or bracelet or the like worn by the vehicle operator.

3 Claims, 4 Drawing Figures

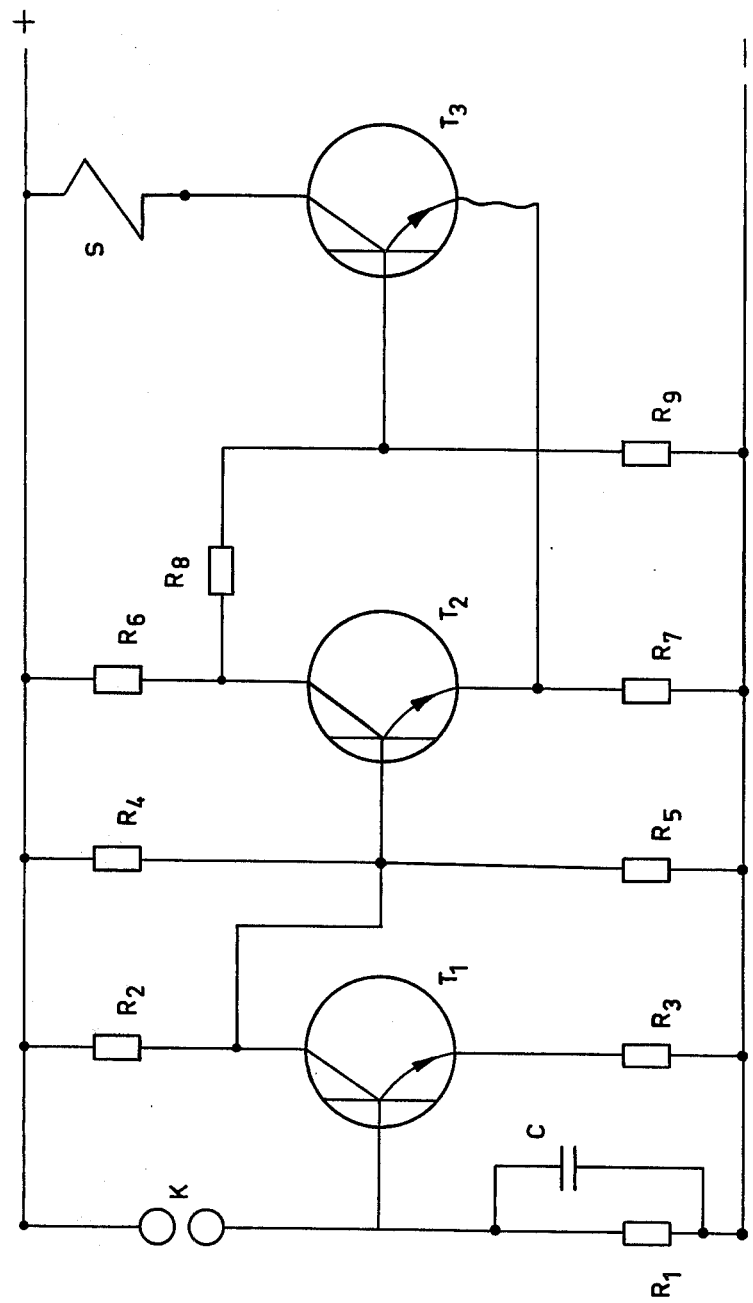

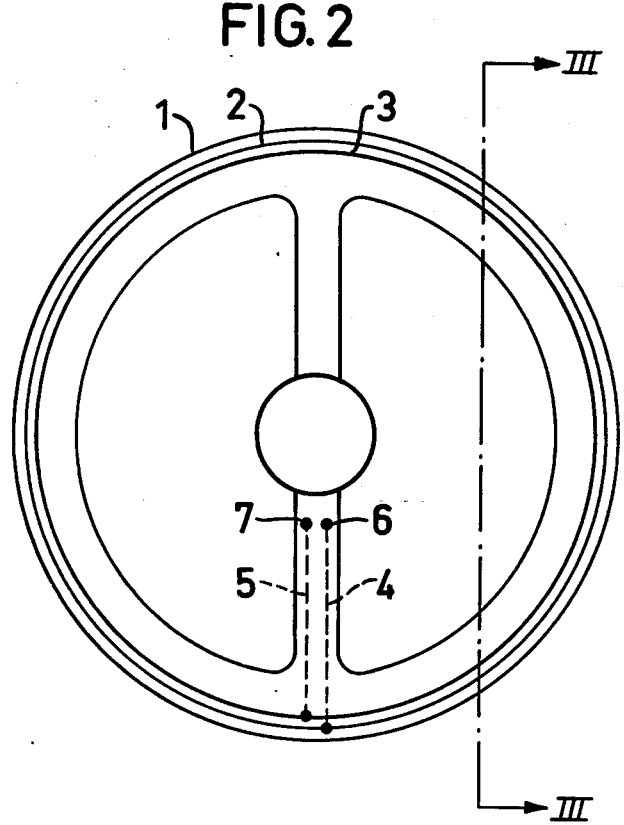
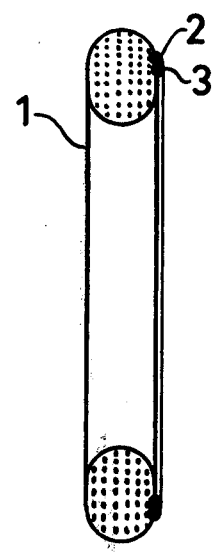

SAFETY DEVICE FOR DYNAMIC UNITS

The present invention refers to a safety device for dynamic units, controlled by means of an operating member having a manual gripping portion.

Numerous and severe accidents or mishaps occur because a car driver, due to a rapidly induced indisposition, a sudden loss of consciousness, or an overwhelming fatigue or drowsiness, relieves his grip of the steering wheel so that the car continues its travel in the absence of any control. Thus, not only the life of the driver but also that of his co-travellers is jeopardized.

The same is true also with respect to motorboats, irrespective of whether they are steered by means of a steering wheel or by means of a rudder bar (the outboard handle). In this case, the danger is increased by the possibility of the driver falling overboard as a result of heavy sea.

Dangerous situations may also arise for different kinds of steering-wheel or lever-operated machines in factories, or the like, as presses, petrol or electric motor operated equipments etc., if the operator's grip of the operating member suddenly is released.

These and other danger factors are eliminated or reduced to a minimum, by arranging along the gripping portion two substantially parallel conductors, the spacing of which is bridged by the hand gripping the operating member, to form a break gap portion in an electric amplifier circuit closed by the resistance of the skin of the hand to provide an amplified signal for actuating a control member to switch the particular unit ON or OFF, while a release of the grip of the hand results in a cut-off of the amplifier circuit and, consequently a switching OFF or ON, respectively, of the unit, whereby dangers arising from an undue releasing of the gripping portion are reduced.

The invention will be described more in detail below with reference to the adjoined drawings. In the drawings, FIG. 1 is a principal diagram of the electric coupling according to the invention;

FIG. 2 a simplified plan view of a car or boat steering wheel adapted for the arrangement of the invention;

FIG. 3 is a cross-section along line III—III in FIG. 2, and

Figure 4:
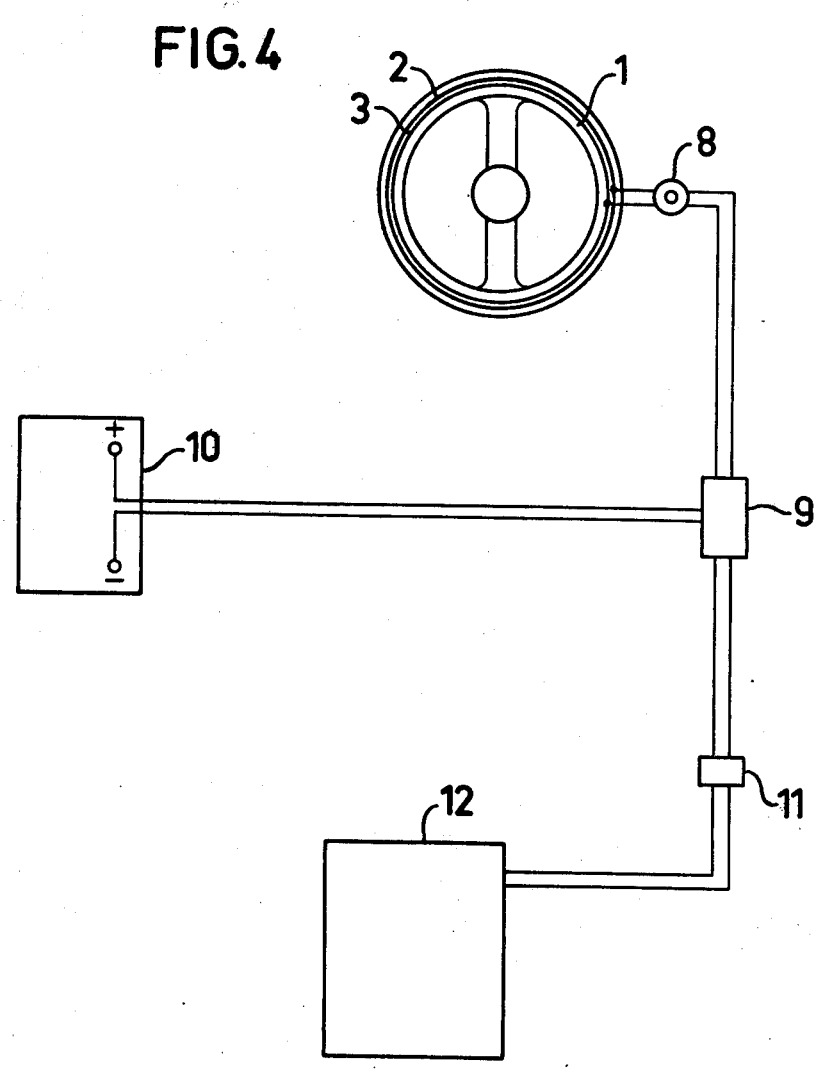
FIG. 4 is a principal view of the invention as applied to a car (or a boat).

In FIG. 1, there is shown a three-stage amplifier with transistors $T_1$, $T_2$ and $T_3$, respectively. The first two stages form a modified type of a Schmitt-trigger, in the input of which the conventional voltage divider for the base of the transistor $T_1$ has been replaced by a high resistance resistor $R_1$ between the base and the negative polarity, and a break gap (or an open circuit part) K between the base and positive polarity. The collector of transistor $T_2$ is connected to the negative polarity over resistors $R_8$ and $R_9$ in series, and the base of the output transistor $T_3$ is connected to the junction between the last-mentioned resistors. The emitter of the transistor $T_3$ is connected to the emitter of transistor $T_2$, and its collector is connected to the positive polarity over a relay coil S. The purpose of the associated relay is to effect a switching OFF or ON function in the particular system.

An example of suitable values and components in the described circuit is set forth below:

| | | |
|---|---|---|
| Resistors | $R_1$ | 10 Mohm |
| | $R_2$ | 600 Kohm |
| | $R_3$ | 120 ohm |
| | $R_4$ | 90 kohm |
| | $R_5$ | 1,4 Mohm |
| | $R_6$ | 900 ohm |
| | $R_7$ | 82 ohm |
| | $R_8$ | 8,2 kohm |
| | $R_9$ | 4,7 kohm |
| Transistors | $T_1$ | BC 107 |
| | $T_2$ | BC 107 |
| | $T_3$ | BC 107 |
| Capacitor | C | 0,022/400 (34154223) |
| Relay | S | e.g. BV 5506/0100(DFG) |

The resistors $R_2$, $R_4$ and $R_5$ may, if desired, be replaced by trimming potentiometers.

The operation of the simple, but special, circuit described above is as follows:

As long as the break gap K remains open, the base of the input transistor $T_1$ is supplied with a negative voltage and the transistor is therefore maintained non-conducting; the circuit is "dead". If, however, the break gap terminals are bridged by placing a finger or the hand over the terminals, the base of the transistor $T_1$ is supplied with a positive voltage from the positive polarity so that the transistor is rendered conductive. This activates the Schmitt-trigger ($T_1$ and $T_2$ inclusive of associated components) which switches over and renders the third transistor $T_3$ conductive so that the realy coil S is energized and activates the associated relay. The relay then closes the circuit to the ignition coil or some other "keying point" in the particular system. (In the case of Diesel engines the relay may instead be arranged to switch on the supply of fuel or air.) This is the normal operating condition.

Now, if the bridged break gap K for some reason is opened, the transistor $T_1$ will obviously again be rendered non-conductive, the transistor $T_2$ will be in a conducting state, and the transistor $T_3$ will be non-conductive; this results in a deactivating of the relay so that the ignition current, or the corresponding quantity, is interrupted.

It should also be observed that the circuit described above, e.g. with the data given, will be "dead" not only for an open break gap but also for a fully developed short-circuit of said gap. In other words, the circuit function desired requires a predetermined minimum resistance over the break gap, which resistance, however, should be lower than the minimum resistance of the human skin (moist hands with a firm grip).

In practice, the two terminals defining the break gap K are in the shape of two substantially parallel conductors (copper wire) fixed along the gripping portion of the particular operation member. If this member is a bar or some other straight handle, the conductors extend along the longitudinal dimension of the operation member.

The application of the invention to a steering wheel may take the form shown in FIGS. 2 and 3. Along the front side (also the backside or the periphery may be used) of a steering wheel 1, two concentric rings 2 and 3 of a well-conducting material, such as copper wire, are fixed; the conducting rings may be partly imbedded in the wheel, as indicated in FIG. 3. The connection of the rings to the input of the amplifier described above, i.e. the break gap K, is shown to extend via preferably imbedded conductors 4 and 5 to terminals 6 and 7, respectively.

The complete system is schematically shown in FIG. 4.

The rings 2 and 3 on the steering wheel 1 are connected to a delay unit 8 for the purpose of preventing a triggering of the safety device not called for, i.e. when the grip of the wheel is momentarily loosened. From the unit 8, extend to the amplifier 9 which is energized from the battery 10 which also supplies the ignition current. From the output of the amplifier, lines are connected to a control member in the form of the relay 11 for the ON and OFF function, the output lines of which extend to the ignition coil in the motor 12.

Now, if the steering wheel is released, the amplifier energizes the relay 11 which after a short time interval determined by the delay unit 8, switches off the ignition current so that the motor is stopped and, thus, also the car.

If, when the grip is released, either hand should be caught by the wheel due to the presence of finger rings, a metal bracelet for a wrist watch or of an ornamental design, a short-circuiting of the two concentric conductors 2 and 3 will not, as mentioned earlier, interfere with the function of the safety device.

The arrangement will be similar for inboard or outboard motors on boats and various work machines which may jeopardize personal safety. In the case of work machines, the arrangement may also serve as a switch. If, for example, a man operating a press wants to, or has to, leave his position at his press, it will automatically come to a standstill, as soon as he lets go of the operating bar; in other words, he is relieved from the additional duty of turning off a switch.

Various modifications of the invention are obvious to one skilled in the art, also numerous other application areas than those described above are within the scope of the invention.

What is claimed is:

1. Safety apparatus for vehicles, machinery, and the like to provide a distinctive signal in the event of incapacitation or drowsiness of an operator including:
   spaced electrical conductors supported on a handgrip control means to provide thereby an open circuit which is bridged by a body portion of the operator during manual operation,
   output means for providing said distinctive signal only when operated to a second distinctive condition from a first normal condition,
   and circuit means connected between said conductors and said output means,
   said circuit means controlling said output means to its said first normal condition only for values of resistance bridging said conductors which fall within a predetermined range,
   said circuit means controlling said output means to its said second distinctive condition both when said conductors are fully short-circuited and open-circuited as well as bridged by a resistance whose value is above said predetermined range.

2. The apparatus of claim 1 wherein said conductors comprise two conductors spaced parallel to each other,
   said circuit means comprising a transistor amplifier stage and voltage divider means including said conductors for providing a controllable bias voltage for said transistor stage,
   said voltage divider means controlling said bias voltage to operate said transistor stage to one conductive state when said conductors are bridged by a resistance falling within said predetermined range and to another conductive state when said conductors are either short-circuited or bridged by a resistance whose value is above said predetermined range,
   said circuit means controlling said output means to provide said distinctive signal only when said transistor stage is in its said another conductive state.

3. The apparatus of claim 2 wherein said transistor amplifier means comprises a first transistor and said voltage divider means comprises in series connection said conductors and also a resistor with the junction therebetween connected to the base of said first transistor,
   said voltage divider means controlling said first transistor to cause substantially all of the current in said transistor to flow through its emitter-base circuit when said conductors are short-circuited,
   said transistor stage including means responsive to the collector current of said transistor for controlling said output means.

* * * * *